June 18, 1940.   F. M. DAVIS   2,204,578
TRANSMISSION CONTROL SYSTEM
Filed March 31, 1938   2 Sheets-Sheet 1

INVENTOR.
Frank M. Davis
BY
John B. Brady
ATTORNEY

June 18, 1940.    F. M. DAVIS    2,204,578
TRANSMISSION CONTROL SYSTEM
Filed March 31, 1938    2 Sheets-Sheet 2

INVENTOR.
Frank M. Davis
BY John B. Brady
ATTORNEY

Patented June 18, 1940

2,204,578

UNITED STATES PATENT OFFICE 2,204,578

TRANSMISSION CONTROL SYSTEM

Frank M. Davis, Cedar Rapids, Iowa, assignor to Collins Radio Company, Cedar Rapids, Iowa, a corporation of Iowa Application March 31, 1938, Serial No. 199,319

4 Claims. (Cl. 179—171)

My invention relates broadly to signal transmission and more particularly to a control system for electrical transmitting circuits.

One of the objects of my invention is to provide a highly efficient transmission control circuit capable of regulating output signal level from absolutely zero to maximum.

Another object of my invention is to provide a balanced transformer circuit in a transmission system, with means for varying current relations therein for regulating the transfer of energy in the transmission system.

Still another object of my invention is to provide a highly efficient transmission control circuit operative by variation of current relations to regulate the effective transfer of energy in a transmission system, energy loss in the control circuit being negligible over the entire range of variation.

A further object of my invention is to provide a transformer coupling circuit in a transmission system having opposed current components normally blocking the transmission of energy through the coupling circuit, and means for separating the current components for transmitting a maximum of energy.

A still further object of my invention is to provide a transformer coupling circuit having dual transmission loop circuits interconnected in opposed relaion for blocking the transfer of energy through the coupling circuit, and means for altering the opposed relation of the loop circuits in varying degree for correspondingly varying the transfer of energy by the coupling circuit.

Still another object of my invention is to provide a transmission loop circuit and an auxiliary loop circuit interconnected in opposed relation with the transmission loop circuit for counteracting and blocking transfer of energy therethrough, and control means for substantially isolating the auxiliary loop circuit from the transmission circuit for regulating the transfer of energy thereby.

A further object of my invention is to provide a transmission control system having a series connected bucking circuit for controlling transfer of energy, and an electron tube shunt circuit controlled from the source of energy for regulating the operation of the bucking circuit and the transfer of energy.

Figure 1:
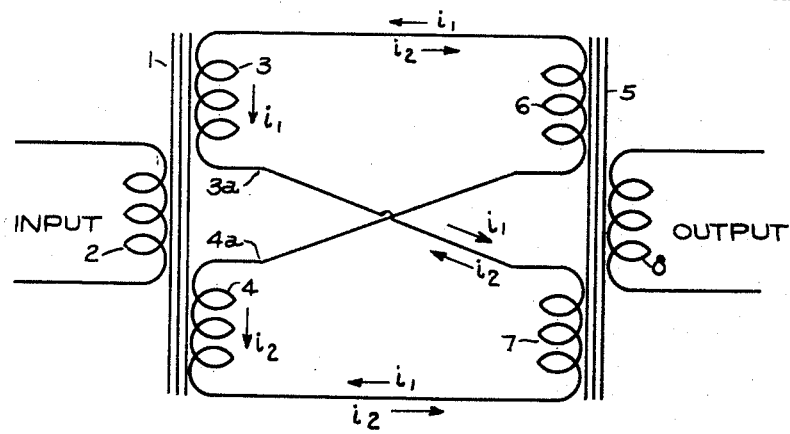
Figure 2:
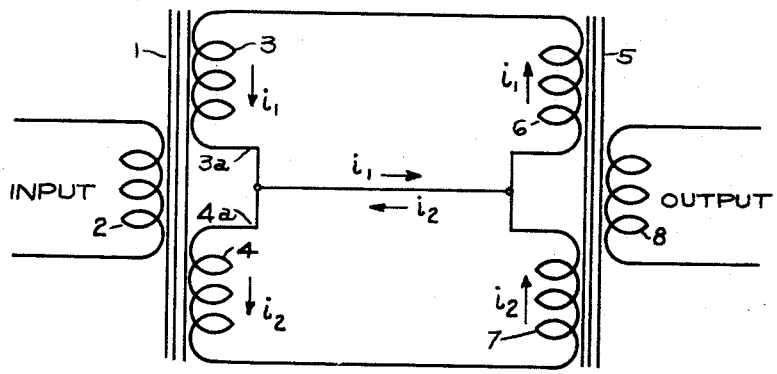
Figure 3:
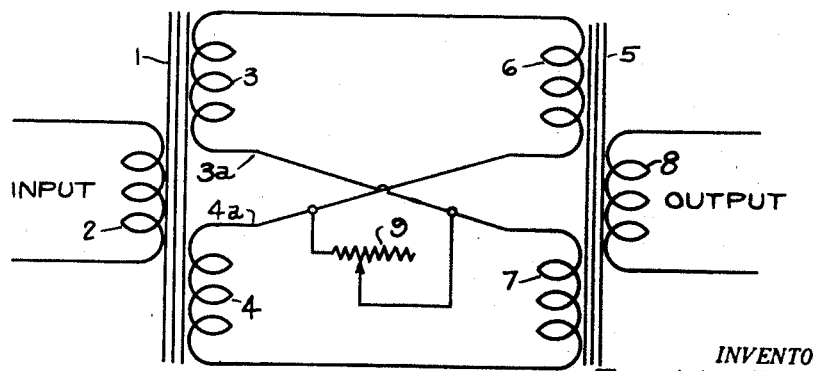
Figure 4:
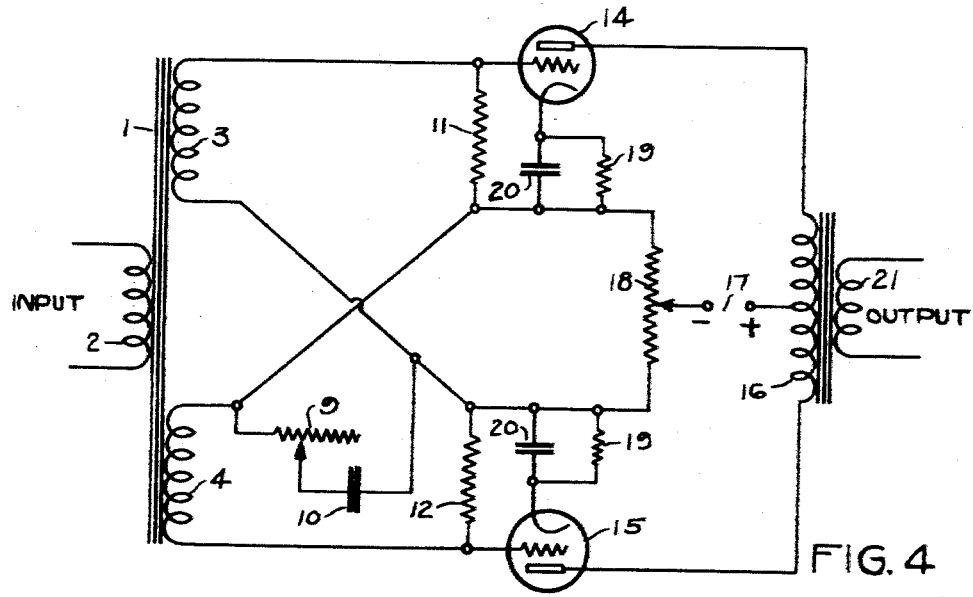
Figure 5:
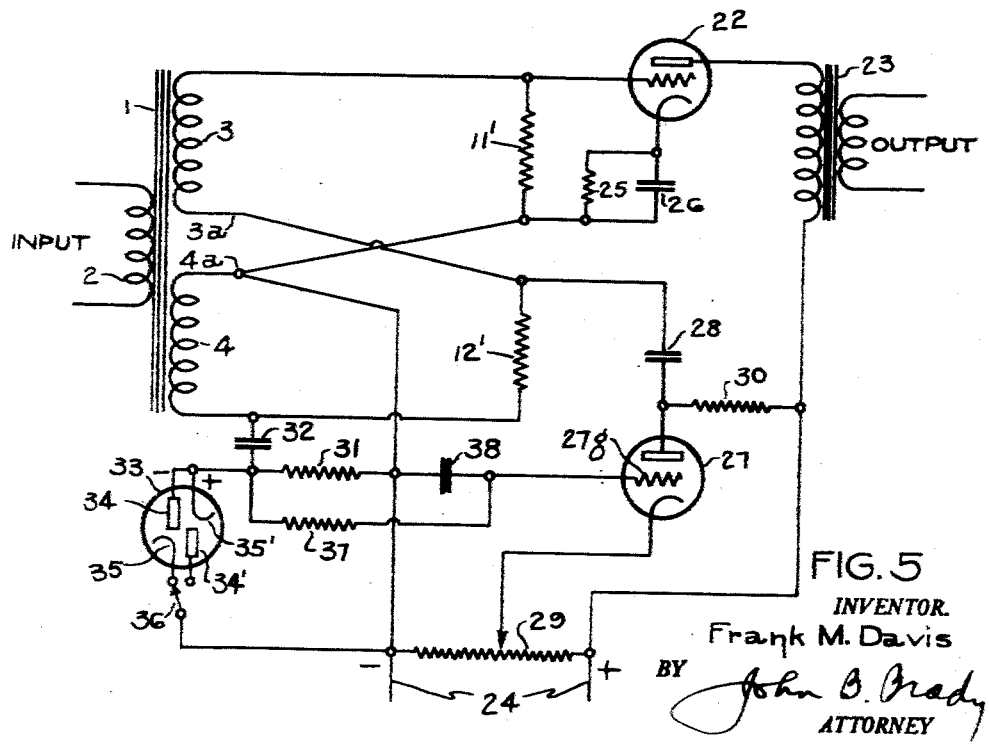

Other and further objects of my invention reside in the circuits and control arrangements hereinafter set forth in more detail with reference to the accompanying drawings, in which:

Figures 1 and 2 are schematic diagrams of balanced transformer coupling circuits illustrating the basic principles of my invention, Fig. 1 indicating zero energy transfer conditions, and Fig. 2 maximum energy transfer conditions; Fig. 3 is a schematic diagram of one form of my invention for regulating energy transfer between the limiting conditions indicated in Figs. 1 and 2; Fig. 4 is a schematic diagram of a balanced electron tube circuit employing the transmission control system of my invention; and Fig. 5 is a schematic diagram of a simple electron tube circuit employing the transmission control system of my invention and automatic regulating means therefor.

The system of my invention employs a transformer having dual secondary windings cooperative to control the transfer of energy in the system. In Figs. 1–3, the transformer 1 has primary input winding 2 and dual secondary windings 3 and 4. A coupling transformer 5, representing suitable output coupling means, has dual primary windings 6 and 7 and secondary winding 8.

In Fig. 1, the dual windings 3, 4, and 6, 7, are connected in a series circuit with instantaneous current conditions indicated by arrows $i_1$ and $i_2$, $i_1$ representing the current due to voltage in winding 3, and $i_2$ that due to voltage in winding 4. In each of windings 3, 6, 4 and 7, the currents $i_1$ and $i_2$ are opposite in phase and are of such magnitude as to balance each other so that no voltage is produced across the output winding 8. Thus, while energy continues to be fed to the input at 2, transfer of energy is blocked by the counteraction of the current $i_1$ and $i_2$ from windings 3 and 4 in the series circuit.

Referring to Fig. 2, by a direct connection between adjacent terminals $3a$ and $4a$ of windings 3 and 4, the series circuit of Fig. 1 is altered in the manner indicated in Fig. 2, and results in parallel loop circuits independently operative. The current $i_1$ flows only from secondary 3 through winding 6; and the current $i_2$ flows only from secondary 4 through winding 7. Terminals $3a$ and $4a$ are connected together, and currents $i_1$ and $i_2$ flow therefrom in phase opposition, with the result that curents $i_1$ and $i_2$ are additive in producing flux in the transformer 5, and voltage appears across output winding 8 in accordance with the input at winding 2. The result is equivalent to that produced by connecting windings 3, 4, 6 and 7 in a series circuit with the currents $i_1$ and $i_2$ in phase and additive in each of the windings, neglecting the neutral connections from terminals $3a$, $4a$.

Fig. 3 shows one arrangement for varying the circuit conditions between zero energy transfer, as in Fig. 1, and maximum energy transfer, as in Fig. 2. Resistance 9 is connected in place of a direct shunt between terminals 3a, 4a, and with maximum resistance in the circuit, conditions are substantially as detailed with respect to Fig. 1; whereas, with zero resistance, equivalent to the direct connection of Fig. 2, the operating conditions described with reference to Fig. 2 obtain. Intermediate values of resistance 9 in circuit result in various degrees of energy transfer, dependent upon the differential or resultant current in the primary windings 6, 7, and the resulting flux in transformer 5 effective to produce a voltage in output winding 8.

Fig. 4 illustrates the application of the transmission control system of my invention to a push-pull electron tube amplifier circuit. Primary windings 6 and 7 of transformer 5 are replaced by ballast resistors 11 and 12 respectively, and a direct current blocking condenser 10 is connected in circuit with control resistor 9. Electron tubes 14, 15, are shown as triodes having the anodes thereof connected at opposite terminals of primary 16 of an output transformer. Anode potential is supplied by a suitable source connected at 17 to a mid-tap on primary 16 and a mid-tap on ballast resistor 18 which has a high resistance so as not to affect the operation of the control system through resistor 9. Condenser 10 prevents the shunting of ballast resistor 18 to the source connected at 17 by resistor 9 so that the anode potential is constant. Bias resistors 19 shunted by by-pass condensers 20 are provided in the cathode connections of the tubes 14, 15.

The operation of the control circuit in the arrangement shown in Fig. 4 is the same as described with reference to Fig. 3. Resistor 9 controls the counteraction of the currents in resistances 11 and 12 and thereby the voltages impressed on the grids of tubes 14 and 15. The output derived from winding 21 is proportional to the voltages in the grid circuits of tubes 14, 15, and is varied therefore in accordance with the operation of resistor 9, being zero when the resistance at 9 is substantially infinite, and maximum when the resistance at 9 is zero. The maximum output corresponds to the maximum input amplified in the tubes 14, 15; that is, the tubes 14, 15, operate independent of the control circuit under normal operating conditions, which conditions are maintained constant throughout the range of variation of the output voltage. The control system of my invention regulates the signal energy effective in the grid circuits and amplified by the tubes, but does not affect the gain of the amplifier stage and the operating potentials applied to the tubes are unaffected.

The control circuit of my invention is highly efficient therefore, as the amplifier may be operated under optimum conditions. Furthermore, there is substantially no loss in the system in the regulating means, as resistor 9 is shunted by parallel circuits and carries little or no current when its resistance is high, and under maximum operating conditions its resistance is substantially zero.

Fig. 5 shows another form of amplifier circuit embodying my invention, with automatic control means. The transformer 1 is provided in circuit with ballast resistors 11′, 12′ similar to the arrangement shown in Fig. 4. The voltage across resistor 11′ is applied to the grid circuit of electron tube amplifier 22, shown as a triode, the output circuit of which includes transformer 23. Anode potential is supplied by a suitable source connected at 24, with the negative of the source connected to the cathode of tube 22 through bias resistor 25, by-pass condenser 26 being in shunt with the bias resistor. The circuit thus far described will produce no output voltage as the current in resistor 11′ is supplied from both windings 3 and 4 in phase opposition so that the grid of tube 22 is unaffected.

In lieu of the resistor 9, shown in Figs. 3 and 4, I provide in the arrangement of Fig. 5 an electronic device 27 with the anode-cathode circuit thereof connected to terminals 3a, 4a, similar to the connections of resistor 9, Figs. 3 and 4. The circuit thus provided includes blocking condenser 28, the anode-cathode path in tube 27, and a portion of potential divider 29 connected across the source at 24. Anode potential for tube 27 is supplied from the potential divider 29 through resistor 30.

Means for varying the resistance of the anode-cathode circuit in tube 27 comprises a grid electrode 27g which may be energized in any desired manner to effect a particular result. In Fig. 5, I provide for the control of potential on grid 27g from the winding 4 of transformer 1 in accordance with variations in level of the signal. The voltage of winding 4 is applied across a resistor 31 in the grid-cathode circuit of tube 27, through a direct current blocking condenser 32. The voltage across resistor 31 is rectified by a selected pair of electrodes in a rectifier tube 33 to provide a potential of suitable sign for controlling tube 27 in the manner desired. Electrodes 34 and 35 in rectifier 33 are coactive to provide a negative potential on grid 27g derived from the signal input, while electrodes 34′, 35′ will coact to provide a positive potential. Switch 36 is shown connectible with electrodes 35 and 34′ as means for selecting the desired operating condition. Condenser 32 blocks the rectifier current from the circuits of tube 22.

The grid-cathode circuit of tube 27 includes a resistor 37, the rectifier circuit 31, 33, and a portion of the potential divider 29. A condenser 38, connected from grid 27g to the negative of the source at 24, coacts with resistor 37 to exclude low frequency signal components from the grid 27g which responds to variations in the direct voltage from the rectifier 33 and thus controls the effective resistance of the anode-cathode circuit of the tube 27 and the signal energy amplified in the tube 22 and transferred to the output.

The resistance of the anode-cathode interelectrode path, or the "plate resistance," of the tube 27 is initially adjusted so that a desired normal signal level is maintained in the output transformer 23. With the connection of switch 36 to electrode 35, as shown, an increase of signal level in winding 4 produces an increased rectified voltage in rectifier 33 and a higher negative potential on grid 27g, increasing the plate resistance of the tube and decreasing the differential of signal energy in resistance 11′, thus effecting uniform transmission of energy. Conversely, with switch 36 connected through electrode 34′, increased signal level would result in higher positive potential on the grid 27g and decreased plate resistance in tube 27, thereby increasing the differential of signal energy in resistance 11′ and accentuating the variation in level.

Variations of the arrangement shown in Fig. 5 may be readily made in order to produce desired operating conditions. The bias potential on grid 27g, obtained from potential divider 29, may be selected such that the plate resistance will be unaffected for small variations in signal level, or variations below a predetermined level. The same results may be obtained by inserting a bias voltage in circuit with the rectifier 33 so that no rectified current will flow until a predetermined level is exceeded.

The control system of my invention is adaptable to prevent flash-overs due to over modulation in radio transmitters, to limit the intensity of static or other transient disturbances encountered in radio reception, and to other uses as may arise. Thus, while I have disclosed my invention in certain preferred embodiments, I desire it understood that modifications may be made therein, and that no limitations upon my invention are intended, except as imposed by the scope of the appended claims.

What I claim as new and desire to secure by Letters Patent of the United States is as follows:

1. A transmission control system comprising a transformer coupling circuit having a transmission loop circuit and an auxiliary loop circuit interconnected in opposed relation for blocking the transfer of energy, and means energized from said auxiliary loop circuit for altering the opposed relation of the loop circuits in varying degree for correspondingly varying the transfer of energy through said transmission loop circuit.

2. A transmission control system comprising in combination with an electron tube amplifier including anode, cathode and grid electrodes, an input transformer having a primary winding and dual secondary windings, a ballast resistor paired with each of said secondary windings, the voltage across one of said resistors being supplied as the input between said grid and cathode electrodes of said amplifier, control means energized from the secondary winding which is paired with the other of said resistors, means interconnecting said dual secondary windings and the ballast resistors respectively paired therewith for supplying energy from each of said secondary windings to both said resistors in phase opposition in each resistor for effectively blocking the transfer of energy to said amplifier, and means for connecting said control means with the last said means for variably supplying energy from said secondary windings directly to the resistors paired respectively therewith, whereby energy is transferred from the said one of said resistors to the said amplifier.

3. A transmission control system as set forth in claim 2 wherein the said control means comprises an electronic device having anode, cathode and grid electrodes, means for supplying operating potentials to said electrodes, said anode and cathode electrodes being connected to adjacent terminals of said secondary windings, and means connected with said grid and said cathode electrodes for varying the internal anode-cathode resistance of said device for varying the energy supplied therethrough directly to said resistors.

4. A transmission control system as set forth in claim 2 wherein the said control means comprises an electronic device having anode, cathode and grid electrodes, means for supplying operating potentials to said electrodes, said anode and cathode electrodes being connected to adjacent terminals of said secondary windings, means for rectifying a portion of the input energy, and means for impressing the rectified energy in predetermined polarity on the grid electrode in said electronic device for automatically varying the internal anode-cathode resistance of said device in accordance with variations in level of the input energy for correspondingly regulating the energy supplied through said resistance directly to said resistors and the energy transferred from the said one of said resistors to the said amplifier.

FRANK M. DAVIS.